(12) United States Patent
Ji et al.

(10) Patent No.: US 10,972,991 B2
(45) Date of Patent: Apr. 6, 2021

(54) SYNCHRONIZATION METHOD AND APPARATUS FOR DEVICE TO DEVICE COMMUNICATION IN WIRELESS COMMUNICATION SYSTEM

(71) Applicant: Samsung Electronics Co., Ltd, Suwon-si (KR)

(72) Inventors: Hyoungju Ji, Seoul (KR); Yongjun Kwak, Yongin-si (KR); Younsun Kim, Seongnam-si (KR); Sangmin Ro, Seoul (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/298,963

(22) Filed: Mar. 11, 2019

(65) Prior Publication Data

US 2019/0208480 A1 Jul. 4, 2019

Related U.S. Application Data

(63) Continuation of application No. 14/905,773, filed as application No. PCT/KR2014/006389 on Jul. 15, 2014, now Pat. No. 10,231,197.

(30) Foreign Application Priority Data

Jul. 15, 2013 (KR) ........................ 10-2013-0082896

(51) Int. Cl.
*H04B 7/00* (2006.01)
*H04W 56/00* (2009.01)

(52) U.S. Cl.
CPC ......... *H04W 56/001* (2013.01); *H04W 56/00* (2013.01); *H04W 56/0015* (2013.01)

(58) Field of Classification Search
CPC ........... H04W 56/001; H04W 56/0015; H04W 56/002; H04W 56/0025; H04W 56/0095
(Continued)

(56) References Cited

U.S. PATENT DOCUMENTS 6,359,869 B1    3/2002   Sonetaka
6,975,877 B1   12/2005   Dergun et al.
(Continued)

FOREIGN PATENT DOCUMENTS

CN      103108389 A    5/2013
EP        1936837 B1    6/2009
(Continued)

OTHER PUBLICATIONS

State Intellectual Property Office of the People's Republic of Chine, The First Office Action, Application No. CN 201480040541.5, dated Jul. 24, 2018, 15 pages.
(Continued)

*Primary Examiner* — Dmitry Levitan

(57) ABSTRACT

Disclosed is a method of transmitting/receiving a signal by a transmission device in a mobile communication system. The method includes: receiving information related to synchronization signals from a Base Station (BS); transmitting a first synchronization signal based on the received information; and receiving a second synchronization signal corresponding to the first synchronization signal based on the received information. When a UE cannot receive a synchronization signal from the BS or is located beyond a coverage of the BS, or when the BS cannot operate due to an emergency or disaster situation, UEs can configure self synchronization therebetween in a predetermined area without any assistance from the BS and thus broadcast and unicast transmission are possible between the UEs based on the synchronization.

16 Claims, 12 Drawing Sheets

(58) Field of Classification Search
USPC .................. 370/310, 324, 328, 338, 350
See application file for complete search history.

(56) References Cited

U.S. PATENT DOCUMENTS

| | | | |
|---|---|---|---|
| 7,983,702 B2 | 7/2011 | Li et al. | |
| 8,675,636 B2 | 3/2014 | Tyrrell et al. | |
| 8,811,142 B2 | 8/2014 | Wang et al. | |
| 9,191,170 B2 | 11/2015 | Jang et al. | |
| 9,699,749 B2* | 7/2017 | Chae | H04W 8/005 |
| 10,231,197 B2* | 3/2019 | Ji | H04W 56/00 |
| 2002/0072381 A1 | 6/2002 | Becker et al. | |
| 2007/0202902 A1 | 8/2007 | Jansen et al. | |
| 2009/0016320 A1 | 1/2009 | Li et al. | |
| 2011/0268101 A1 | 11/2011 | Wang et al. | |
| 2012/0096186 A1 | 4/2012 | Chang et al. | |
| 2012/0120885 A1 | 5/2012 | Wang et al. | |
| 2013/0077512 A1 | 3/2013 | Chang et al. | |
| 2013/0150108 A1 | 6/2013 | Yang et al. | |
| 2015/0319724 A1* | 11/2015 | Chae | H04W 8/005 370/315 |
| 2016/0037549 A1 | 2/2016 | Seo et al. | |
| 2016/0050702 A1 | 2/2016 | Sorrentino et al. | |
| 2019/0208480 A1* | 7/2019 | Ji | H04W 56/0015 |

FOREIGN PATENT DOCUMENTS

| | | |
|---|---|---|
| JP | H11-18143 A | 1/1999 |
| JP | 2010-533431 A | 10/2010 |
| KR | 10-2013-0028106 A | 3/2013 |
| KR | 10-2013-0029355 A | 3/2013 |
| WO | 2007/077530 A2 | 7/2007 |
| WO | 2011/130630 A1 | 10/2011 |
| WO | 2012/037160 A1 | 3/2012 |
| WO | 2014/148835 A1 | 9/2014 |

OTHER PUBLICATIONS

Japan Patent Office, "Notice of Reasons for Refusal," Application No. JP 2016-527926, dated Jul. 9, 2018, 6 pages.
"Discusion on D2D discovery methods", 3GPP, May 2013, p. 1-5, R1-132068.
International Search Report dated Oct. 8, 2014 in connection with International Patent Application No. PCT/KR2014/006389, 3 pages.
Written Opinion of the International Searching Authority dated Oct. 8, 2014 in connection with International Patent Application No. PCT/KR2014/006389, 5 pages.
Extended European Search Report dated Jul. 6, 2016 in connection with European Application No. 14825601.9, 6 pages.
Result of consultation dated Mar. 14, 2019 in connection with European Patent Application No. 14 825 601.9, 4 pages.
Korea Intellectual Property Office, "Office Action," Application No. KR 10-2013-0082896, dated Sep. 10, 2019, 10 pages.

* cited by examiner

SYNCHRONIZATION METHOD AND APPARATUS FOR DEVICE TO DEVICE COMMUNICATION IN WIRELESS COMMUNICATION SYSTEM

CROSS-REFERENCE TO RELATED APPLICATIONS

The present application is a continuation of U.S. patent application Ser. No. 14/905,773 filed on Jan. 15, 2016, which is a 371 of International Patent Application No. PCT/KR2014/006389 filed on Jul. 15, 2014, which claims priority to Korean Patent Application No. 10-2013-0082896 filed on Jul. 15, 2013, the disclosures of which are herein incorporated by reference in their entirety.

BACKGROUND

1. Field

The present invention relates generally to a method and an apparatus for performing direct communication between wireless devices in a wireless communication system, and more particular to a method in which UEs beyond a coverage of a BS obtain synchronization therebetween even in a state where there is no coverage of the BS and perform transmission/reception therebetween based on the obtained synchronization.

Further, the present invention relates to a method of obtaining self synchronization between UEs in an emergency and disaster situation and supporting broadcast transmission or unicast transmission based on the synchronization.

2. Description of Related Art

In general, mobile communication systems have been developed for a purpose of providing communication while securing mobility of a user. The mobile communication systems have reached a stage where a high speed data communication service can be provided as well as voice communication on the strength of the rapid development of technologies.

Currently, a standardization operation from a 3rd Generation Partnership Project (3GPP) system to a Long Term Evolution (LTE) system is being progressed as one of next generation mobile communication systems. The LTE-A system has been developed to continuously improve the performance and implements a high speed packet-based communication having a transmission rate 3 to 10 times higher than a currently provided data transmission rate.

Further, a device to device communication has been continuously researched since the 2000's. A current mobile communication system can perform communication such as data transmission/reception through a wireless network of a Base Station (BS) and a wired network connected to the network for data transmission between User Equipments (UEs) within the same BS or neighboring BSs. Accordingly, the device to device communication has been researched to reduce loads and support effective communication between neighboring UEs when there is no wireless network. In addition, device to device communication which can be effectively performed in a state where there is no BS or the BS does not operate due to emergency or disaster is being researched.

Hereinafter, it must be understood that the LTE system refers to a meaning including both the LTE system and the LTE-A system.

In device to device communication, different User Equipment's (UEs) can communicate with each other without interference therebetween only when synchronization is maintained based on a Base Station (BS) signal in a state where a BS exists in a wireless communication system. Accordingly, the communication is operated based on a BS synchronization signal. When the BS does not exist, the BS signal cannot be detected, or the BS does not operate due to an emergency or disaster situation, the BS synchronization signal is not received by the UE, so that the communication is not possible. Therefore, in order to effectively communicate in such a situation, a method of obtaining synchronization by itself and a method and an apparatus for performing data communication between UEs based on the method are required.

SUMMARY

In accordance with an aspect of the present invention, a method of transmitting/receiving a signal by a transmission device in a mobile communication system is provided. The method includes: receiving information related to synchronization signals from a Base Station (BS); transmitting a first synchronization signal based on the received information; and receiving a second synchronization signal corresponding to the first synchronization signal based on the received information.

In accordance with another aspect of the present invention, a method of transmitting/receiving a signal by a reception device in a mobile communication system is provided. The method includes: receiving a first synchronization signal from a transmission device; and transmitting a second synchronization signal corresponding to the first synchronization signal based on the first synchronization signal.

In accordance with another aspect of the present invention, a transmission device transmitting/receiving a signal in a mobile communication system is provided. The transmission device includes: a transceiver for transmitting/receiving a signal to/from at least one of a Base Station (BS) and a reception device; and a controller for controlling the transceiver, receiving information related to synchronization signals from the BS, transmitting a first synchronization signal based on the received information, and receiving a second synchronization signal corresponding to the first synchronization signal based on the received information.

In accordance with another aspect of the present invention, a reception device transmitting/receiving a signal in a mobile communication system is provided. The reception device includes: a transceiver for transmitting/receiving a signal to/from at least one of a transmission device and a Base Station (BS); and a controller for controlling the transceiver, receiving a first synchronization signal from the transmission device, and transmitting a second synchronization signal corresponding to the first synchronization signal based on the first synchronization signal.

According to an embodiment of the present invention, when a UE cannot receive a synchronization signal from the BS or is located beyond a coverage of the BS, or when the BS cannot operate due to an emergency or disaster situation, UEs can configure self synchronization therebetween in a predetermined area without any assistance from the BS and thus broadcast and unicast transmission are possible between the UEs based on the synchronization. Advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
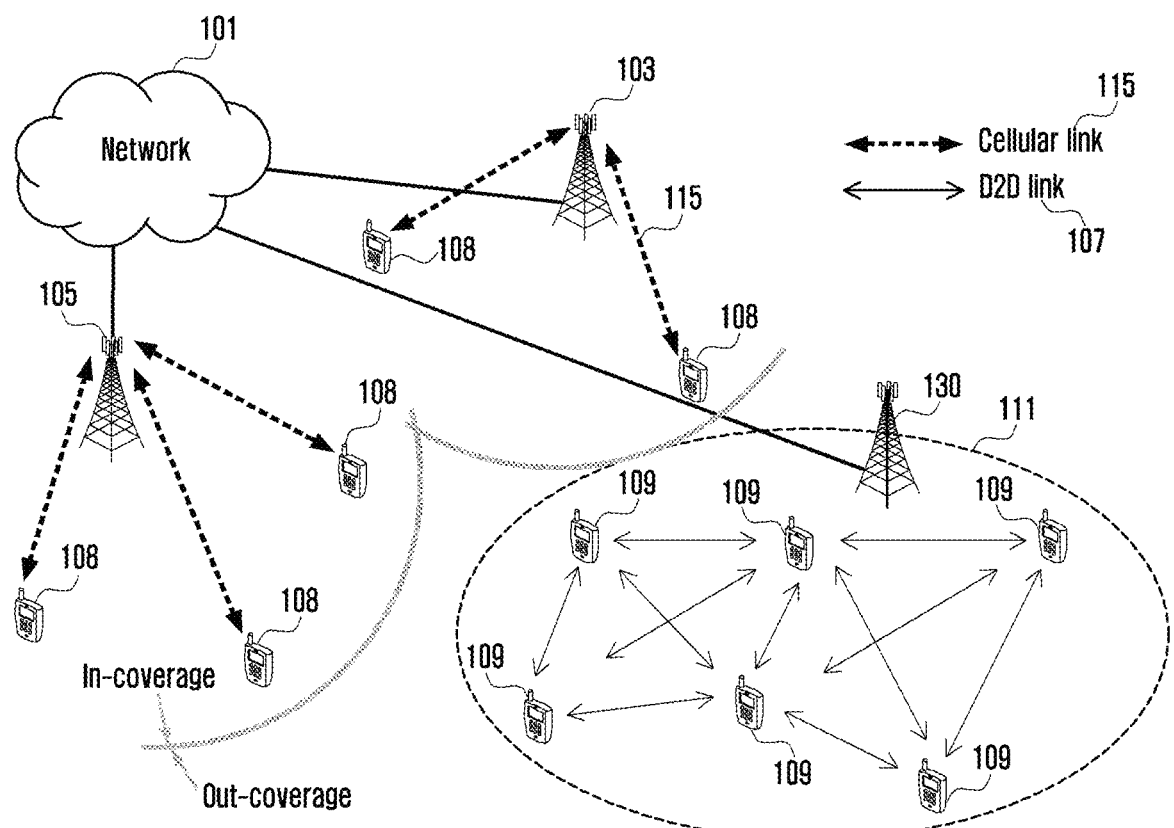
FIG. 1 illustrates a communication system between UEs to which an embodiment of the present invention is applied.

Hereinafter, embodiments of the present invention will be described in detail with reference to the accompanying drawings.

In describing the embodiments of the present disclosure, descriptions of technical details that are well-known in the art and are not directly associated with the embodiments of the present disclosure will be omitted. This is intended to prevent obscuring of the main idea of the present invention and more clearly transfer the main idea by omitting unnecessary descriptions.

In the following description of embodiments of the present disclosure, a detailed description of known functions or configurations incorporated herein will be omitted when it is determined that the detailed description thereof may unnecessarily obscure the subject matter of the present invention. Hereinafter, embodiments of the present disclosure will be described with reference to the accompanying drawings.

Embodiments of the present invention are for device to device communication performed by a UE using downlink or uplink in a communication system in which a BS transmits a downlink signal to the UE and the UE transmits an uplink signal to the BS, the UE being able to access an LTE system. An LTE downlink signal includes a data channel including information, a control channel transmitting a control signal, and a Reference Signal (RS) for channel measurement and channel feedback. An LTE uplink signal includes a data channel including information, a control channel transmitting feedback information or a control signal, and a Sounding Reference Signal (SRS) for measuring a channel of the UE by the BS.

An LTE BS transmits data information and control information to the UE through a Physical Downlink Shared CHannel (PDSCH) and a DownLink Control CHannel (DLCCH), respectively.

The uplink includes a data channel, a control channel, and a reference signal which the UE transmits to the BS, and the data channel is transmitted through a Physical Uplink Shared CHannel (PUSCH) and the control channel is transmitted through a Physical Uplink Control CHannel (PUCCH).

The LTE BS may have a plurality of reference signals, and the plurality of reference signals may include one or more of a Common Reference Signal (CRS), a Channel State Information RS (CSI-RS), and a DeModulation Reference Signal (DMRS) or a UE-specific reference signal.

The CRS is transmitted over full downlink bandwidths and used when all UEs within a cell demodulate signals and measure channels. In order to reduce resources used for CRS transmission, the BS transmits a UE-specific DMRS only to an area scheduled for the UE with the UE-specific DMRS and transmits a CSI-RS on time and frequency axes to obtain channel information.

The UE transmits the data channel (PUSCH) and the control channel (PUCCH) by using the UE-specific DMRS and may also transmit a Sounding Reference Signal (SRS) to measure an uplink channel. The SRS is transmitted to a last symbol of a subframe and cannot be transmitted simultaneously with the PUSCH and the PUCCH. In general, when the PUCCH is transmitted at an edge of the uplink bandwidth, the PUSCH may be transmitted over the full bandwidths.

FIG. 1 illustrates a system for device to device communication in a communication system in which the BS transmits/receives data to/from the UE.

Referring to FIG. 1, BSs 103 and 105 may communicate with UEs 108 and 109 and such communication may be supported within a coverage of the BS where a synchronization signal of the BS is transmitted.

At this time, data to be transmitted to the UEs 108 and 109 is transmitted from a network 101 to the BS 105, and the BS 105 schedules radio resources and transmits data 115 to the UE 108.

However, when the BS 103 loses the coverage due to an emergency or disaster situation, the UE 109 cannot communicate any more since the UE 109 cannot find the BS. In this case, when the device to device communication supports communication between the UEs 109 which are not included within the coverage of the BS and thus the communication between the UEs 109 is performed, data is transmitted and users using the UEs can communicate with each other.

Figure 2:
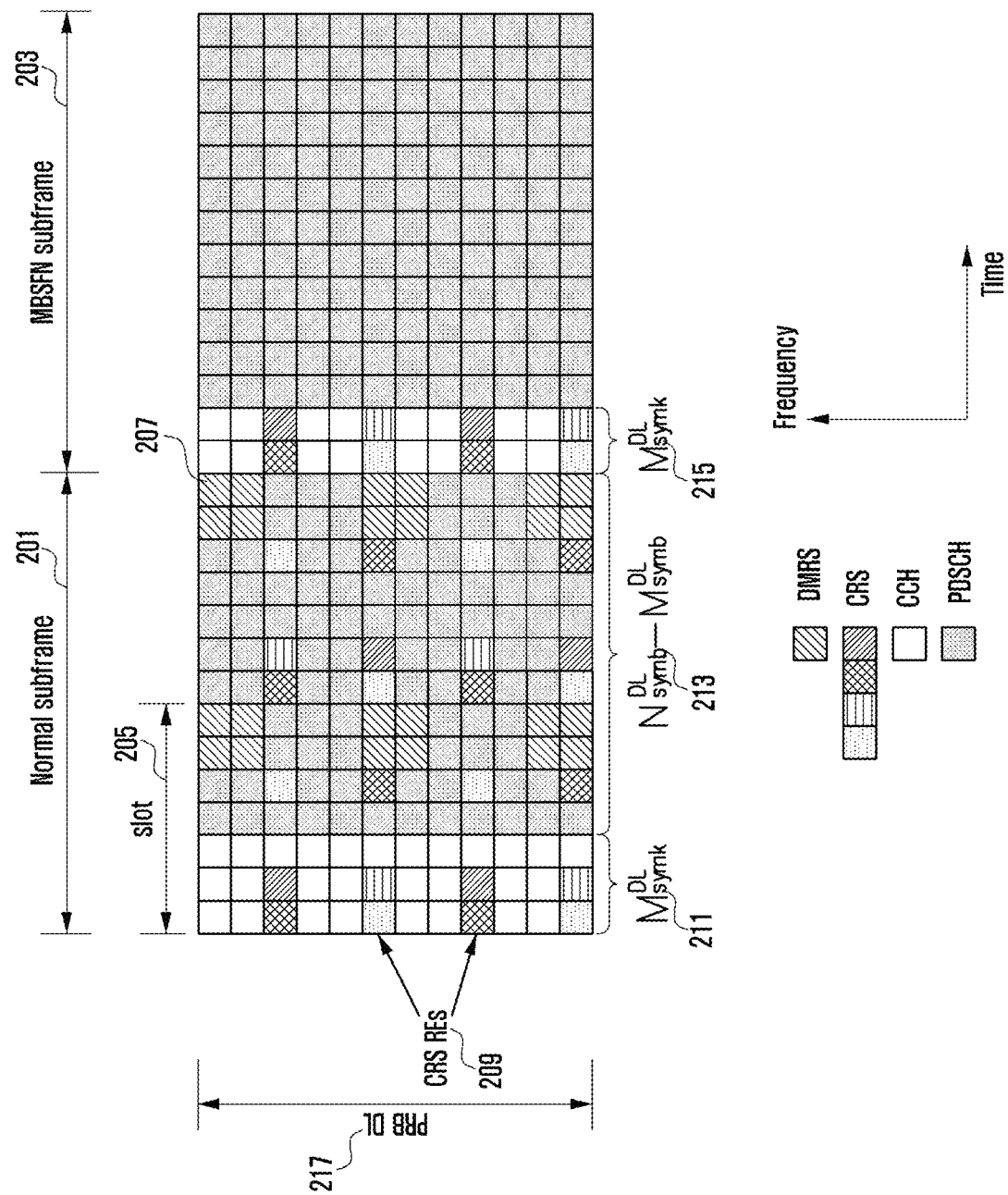
FIG. 2 illustrates a configuration of a downlink subframe of an LTE system to which an embodiment of the present invention is applied.

FIG. 2 illustrates a downlink subframe.

Referring to FIG. 2, a scheduling unit of the BS is a downlink subframe 201 or 203, and one subframe 201 or 203 includes two slots 205 corresponding to a total of $N_{symb}^{DL}$ symbols and transmits a control channel, a data channel, and a reference signal.

Among the $N_{symb}^{DL}$ symbols, chronologically earlier $M_{symb}^{DL}$ symbols are used for transmitting a control channel 211 and the remaining symbols $N_{symb}^{DL} - M_{symb}^{DL}$ are used for transmitting a data channel 213.

A transmission bandwidth is configured by Resource Blocks (RBs) 217 on the frequency. Each of the RBs 217 consists of a total of $N_{SC}^{RB}$ subcarriers or Resource Elements (REs) and a unit including two slots on the time axis and one RB is referred to as a PRB pair. The PRB pair transmits a Common Reference Signal (CRS) 209, A Channel State Information-Reference Signal (CSI-RS), and a DeModulation RS (DMRS) 207.

In order to measure a downlink channel, the BS transmits the CRS or the CSI-RS to allow the UE to perform the channel measurement. When the UE reports a result of the channel measurement to the BS, the BS can know a status of a downlink channel between the BS and the UE.

A downlink subframe may be divided into a normal subframe 201 and an MBSFN subframe 203 according to a structural characteristic thereof. Equally to the normal subframe, the MBSFN subframe performs transmission in the first two symbols as indicated by a reference numeral 215 but does not transmit the CRS in the remaining symbols which is a difference between them.

Figure 3:
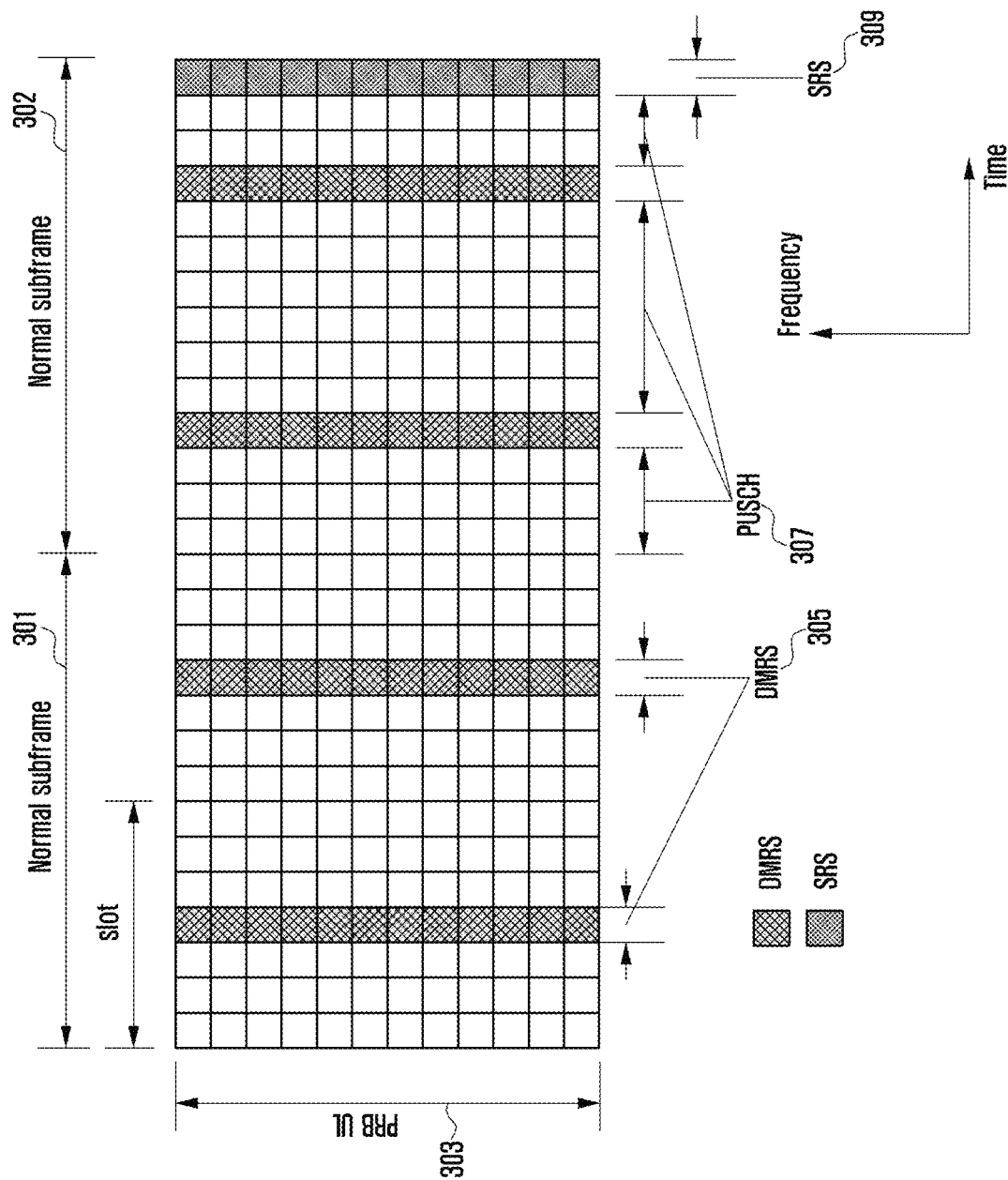
FIG. 3 illustrates a configuration of an uplink subframe of an LTE system to which an embodiment of the present invention is applied.

FIG. 3 illustrates a configuration of an uplink subframe of the LTE system to which an embodiment of the present invention is applied.

Referring to FIG. 3, the BS instructs the UE to transmit an SRS 309 so as to perform uplink channel measurement. Specifically, the BS can recognize the uplink channel (channel status) by receiving the SRS 309 transmitted by the UE. The UE uses an uplink subframe 301 as a basic time unit for the transmission and each of uplink subframes 301 and 302 includes two slots. The subframe consists of a total of $N_{symb}^{UL}$ symbols, and the UE transmits a control channel, a data channel 307, a reference signal 305 and the like through the symbols.

The control channel (PUCCH) is transmitted at an edge on the frequency in the uplink band and one PUCCH may be transmitted alternately at both uplink edges in the unit of slots.

The control channel and the data channel allocate parts of the symbols of an allocation region to the RS (DMRS) 305 as illustrated in FIG. 1, so that the BS can demodulate the signal transmitted by the UE. The SRS is transmitted to the last symbol of the subframe 302 as indicated by a reference numeral 309. At this time, the data channel is not transmitted to the last symbol where the SRS is transmitted.

The device to device communication may support largely two types of communication. The first type of communication corresponds to unicast transmission and refers to transmission by direct communication between one UE and another UE. The second type of communication corresponds to multicast or broadcast transmission and refers to transmission in which one UE transmits the same data to an unspecified multitude of UEs. The unicast transmission refers to data transmission such as voice data transmission or a messenger to a specific user, and the multicast or broadcast transmission may include communication such as emergency information, advertisement, marketing, or traffic information transmitted to unspecified multitudes.

When the UE cannot identify the BS any more since the UE escapes from an area of the BS for a long time or the UE is located at a coverage hole, or when the BS is damaged or cannot operate since an emergency or disaster situation such as blackout, earthquake, tidal wave, typhoon, hurricane, or tsunami occur, the UE cannot communicate with the BS and UEs lose all synchronizations. In such a disaster situation, functions of the UE are not damaged. Accordingly, if communication between UEs is possible, adjacent UEs can transmit/receive data, so that an emergency rescue team may arrive and recognize a signal for help to save a life. Further, when a predetermined BS cannot operate, communication between UEs connected to the corresponding BS is possible since the UEs are located physically close to each other. However, when the BS cannot operate, the UEs having received communication from the corresponding BS lose synchronization and the UEs having lost the synchronization cannot perform communication even though they actually have a UE communication function.

As described above, it is required to secure the synchronization between UEs in order to transmit/receive data between the UEs which go beyond the coverage of the BS or cannot transmit/receive data to/from the BS. When the BS cannot communicate, a subject such as the BS which starts synchronization for UEs or provides information on the synchronization disappears. Accordingly, the UEs are required to obtain synchronization through their own determination by themselves and thus a separate synchronization structure different from the LTE system for data transmission/reception to/from the BS is needed. The separate synchronization structure corresponds to a method of effectively obtaining synchronization and obtaining synchronization by itself without separate signaling.

Figure 4:
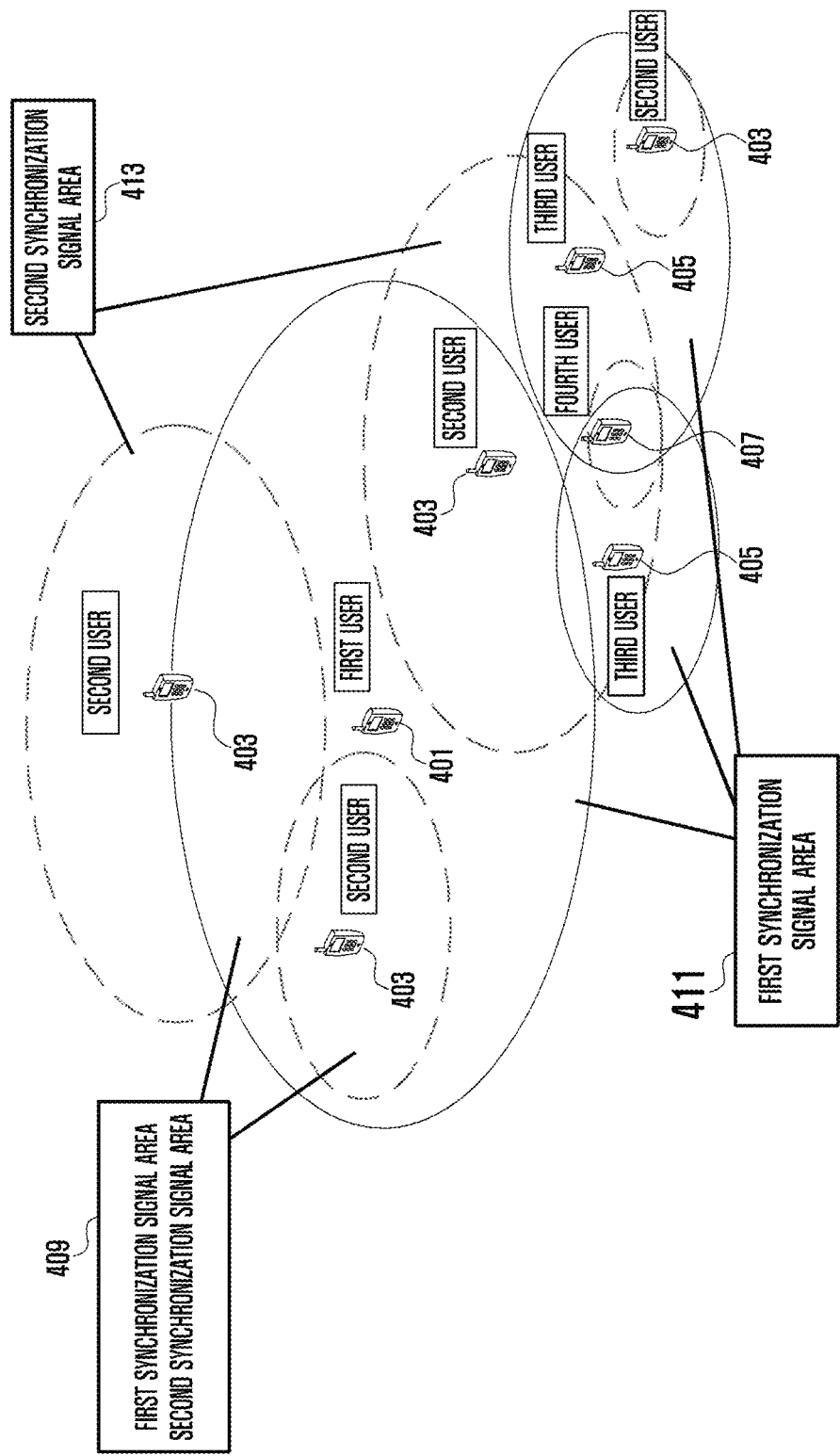
FIG. 4 illustrates a communication method between UEs provided by an embodiment of the present invention.

FIG. 4 illustrates a synchronization transmission method provided by an embodiment of the present invention.

In the embodiment, the provided synchronization transmission method uses a first synchronization signal and a second synchronization signal. The UE searches for the first synchronization signal or the second synchronization signal in an asynchronous state. When both the first and second synchronization signals are not found in the asynchronous state, the UE transmits the first synchronization signal. When the first synchronization signal is found but the second synchronization signal is not found, the UE synchronizes itself with the first synchronization signal and transmits only the second synchronization. When the second synchronization signal is found but the first synchronization signal is not found, the UE synchronizes itself with the second synchronization signal and transmits only the first synchronization signal. When both the first and second synchronization signals are found, the UE synchronizes itself with the first and second synchronization signals and transmits no synchronization signal. In some embodiments, the first synchronization signal and the second synchronization signal may be synchronization signals having preset different sequences. Further, in another embodiment, the first synchronization signal and the second synchronization signal may be synchronization signals transmitted or received according to different periods.

Referring to FIG. 4, a first user 401 corresponds to a UE of which first synchronization and second synchronization are not detected and may determine whether the first synchronization and the second synchronization exist for a predetermined time. When the first synchronization signal and the second synchronization signal are not detected or when the first synchronization signal and the second synchronization signal do not have a high enough signal quality, the UE of the first user 401 transmits the first synchronization signal within a range including an area indicated by a reference numeral 411 near the UE. The range within which the first synchronization signal is transmitted may be selectively determined according to the UE. In this case, the area of the first synchronization signal is formed near the UE according to transmission power of the first synchronization signal transmitted by the first user 401 and a channel status, as indicated by the reference numeral 411. At this time, UEs corresponding to a second user 403 receive the first synchronization signal transmitted by the first user 401. However, since the first user 401 does not transmit the second synchronization signal, the UEs corresponding to the second user 403 receive only the first synchronization signal and the second user transmits the second synchronization signal. When the UEs corresponding to the second user 403 transmit the second synchronization signal, a second synchronization signal area 413 may be formed near the UEs of the second user 403 while partially overlapping the first synchronization signal area. When a third user 405 can receive only the second synchronization signal even though the UEs corresponding to the first user 401 and the second user 403 transmit the first synchronization signal and the second synchronization signal, the third user 405 transmits only the first synchronization signal. When a fourth user 407 can receive both the first synchronization signal and the second synchronization signal, the fourth user 407 transmits nothing. In some embodiments, the synchronization signal transmission method may include a step of, when both synchronization signals are received, selecting a synchronization signal having reception quality lower than preset reception quality between the two received signals and re-transmitting the selected synchronization signal.

In a provided embodiment, determining whether the synchronization signals are received may include a case where reception quality of the synchronization signal is larger than or equal to a particular reference and is configured in advance by signaling, a case where the reception quality is written in a memory of the UE in advance, or a case where reception power is determined to be larger than or equal to a predetermined reference. In the provided embodiment, determining the transmission power of the synchronization signal includes all of a case where the synchronization signal is transmitted in inverse proportion to the received synchronization signal quality or configured by higher signaling, a case where the transmission power is written in a memory of the UE in advance, or a case where the same transmission power is always used.

In the provided embodiment, an interval between the first synchronization signal and the second synchronization signal and an interval between the second synchronization signal and the first synchronization signal are constant while a predetermined time internal between the first synchronization signal and the second synchronization signal is maintained. This is because the UE cannot know when the synchronization signal is transmitted in an asynchronous state and also is to include a time when a receiver and a transmitter are switched. In the provided embodiment, transmission signals of the first synchronization signal and the second synchronization signal are transmitted using particular sequences, and the first synchronization signal and the second synchronization signal use different sequences which can be distinguished from each other. However, an embodiment of the present invention includes a case where the first synchronization signal and the second synchronization signal use the same sequence. When the first synchronization signal and the second synchronization signal use the same sequence, the UE searches for the sequence on a period of 5 msec by using one sequence. When the found sequence is received on a period of 10 msec, the UE recognizes that only one of the first synchronization signal and the second synchronization signal is detected and transmits the other signal after 5 msec. Accordingly, the distinguishment between the first synchronization signal and the second synchronization signal is made through not only the use of different sequences but also the use of the same sequence transmitted at different time. Further, in some embodiments, the first synchronization signal and the second synchronization signal have the same period and may have different offset values. More specifically, the first synchronization signal and the second synchronization signal have a period of 10 msec, and the first synchronization signal has an offset value of 0 msec and the second synchronization signal has an offset value of 5 msec. Through such a configuration, the first synchronization signal and the second synchronization signal are distinguished and transmitted using one sequence. Information related to the above described synchronization signals may be received from the BS or may be preset in the UE.

Figure 5:
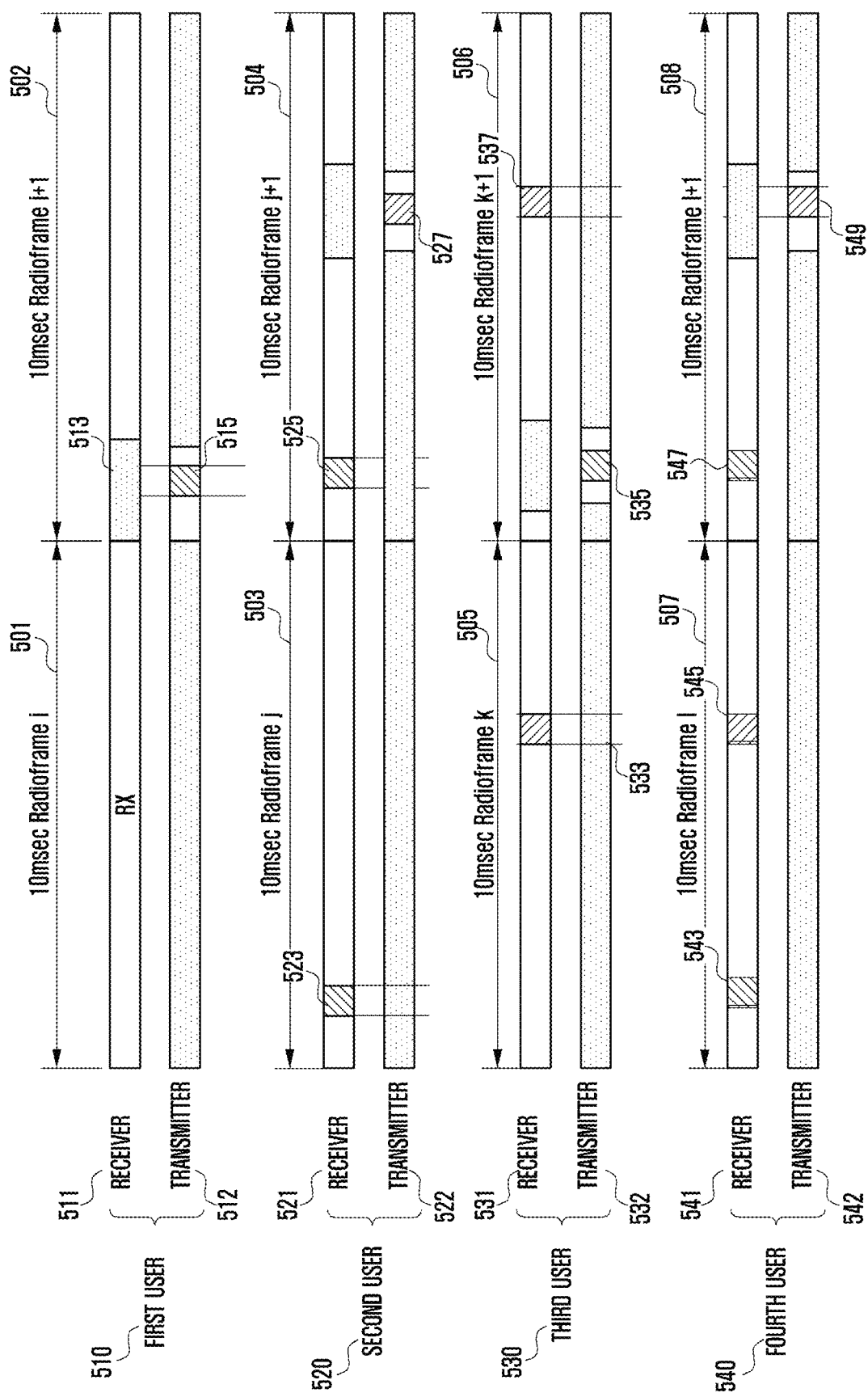
FIG. 5 illustrates a process of transmitting and receiving a synchronization signal for device to device communication provided by an embodiment of the present invention.

FIG. 5 illustrates a process of transmitting/receiving, on a time axis, the first synchronization signal and the second synchronization signal provided by an embodiment of the present invention.

Referring to FIG. 5, a first user 510, a second user 520, a third user 530, and a fourth user 540 are users which may correspond to the first user 401, the second user 403, the third user 405, and the fourth user 407 of FIG. 4.

The first synchronization signal and the second synchronization signal are transmitted in radio frames 501 and 502 of the LTE system and the radio frame 501 having a length of 10 msec is illustrated for an exemplary embodiment. However, the signals may be used for a frame having a different length. FIG. 5 illustrates a synchronization signal transmitting/receiving operation according to an embodiment of the present invention from a viewpoint of a transmitter and a receiver of each user.

The first user 510 is in an asynchronous state and has received no synchronization signal. In this case, the first user 510 operates a receiver in a reception mode in the radio frame 501 to attempt to receive the first synchronization signal and the second synchronization signal. The embodiment of the present invention includes a case where one or more radio frames 501 are used for reception. When the first user 501 has received no synchronization signal, the first user 501 turns off a receiver 511 in a part 513 of the radio frame 502 and transmits a first synchronization signal 515 to a transmitter 512. However, in some embodiments, the first user 510 may operate the transmitter 512 without turning off the receiver 511.

When the second user 520 receives a first synchronization signal 523 in a state where a receiver 521 is in a reception mode, the second user 520 continuously maintains first synchronization signals 523 and 525 in the reception state in a radio frame 504 and then transmits the second synchronization signal at a time point 527 when the second synchronization signal should be transmitted.

The third user 530 receives only a second synchronization signal 533 in a state where a receiver 531 is in a reception mode in a radio frame 505. In this case, the third user 530 transmits a first synchronization signal 535 while continuously receiving a second synchronization signal 537 in a radio frame 506. The fourth user 540 is a user who receives both a first synchronization signal 543 and a second synchronization signal 545. The fourth user 540 mostly receives the same first synchronization signal 543 and second synchronization signal 545 from a plurality of users, but the reception may have a little error according to a distance of the UE performing the transmission. However, since several UEs perform the transmission, reception quality can be improved.

The fourth user 540 transmits nothing when both the first synchronization signal 543 and the second synchronization signal 545 have high reception quality as described above. However, when the signal quality of the second synchronization signal 545 is lower than a reference, the second synchronization signal can be transmitted as indicated by a reference numeral 549.

As illustrated in FIGS. 4 and 5, when each of the users determines the synchronization signal transmitted by itself according to the number or a period of received synchronization signals, an area formed using the first synchronization signal, an area formed using the second synchronization signal, and an area formed using both the first synchronization signal and the second synchronization signal exist in particular regions between the UEs and there are UEs synchronized using the first synchronization signal and UEs synchronized using the second synchronization signal. Since the UE synchronized using the first synchronization signal transmits the second synchronization signal and the UE synchronized using the second synchronization signal transmits the first synchronization signal, the UE synchronized using the first synchronization signal and the UE synchronized using the second synchronization signal may have the same synchronization therebetween.

After the synchronization of the UEs is formed, broadcast or unicast transmission can be performed between the UEs. In general, the broadcast transmission is needed most in a disaster situation, and the unicast transmission may be performed in the same way. That is, in an embodiment of the present invention, the UE receives all data channels. However, in the unicast transmission, the UE performs only a reception operation without a transmission operation for the received data channel. In the broadcast transmission, the UE performs both the reception operation and the transmission operation. Further, in the unicast transmission, the UE inserts identification information such as a UE ID into the transmitted data and transmits the data to one or more of specified transmission and reception UEs, so as to perform the unicast transmission.

Figure 6:
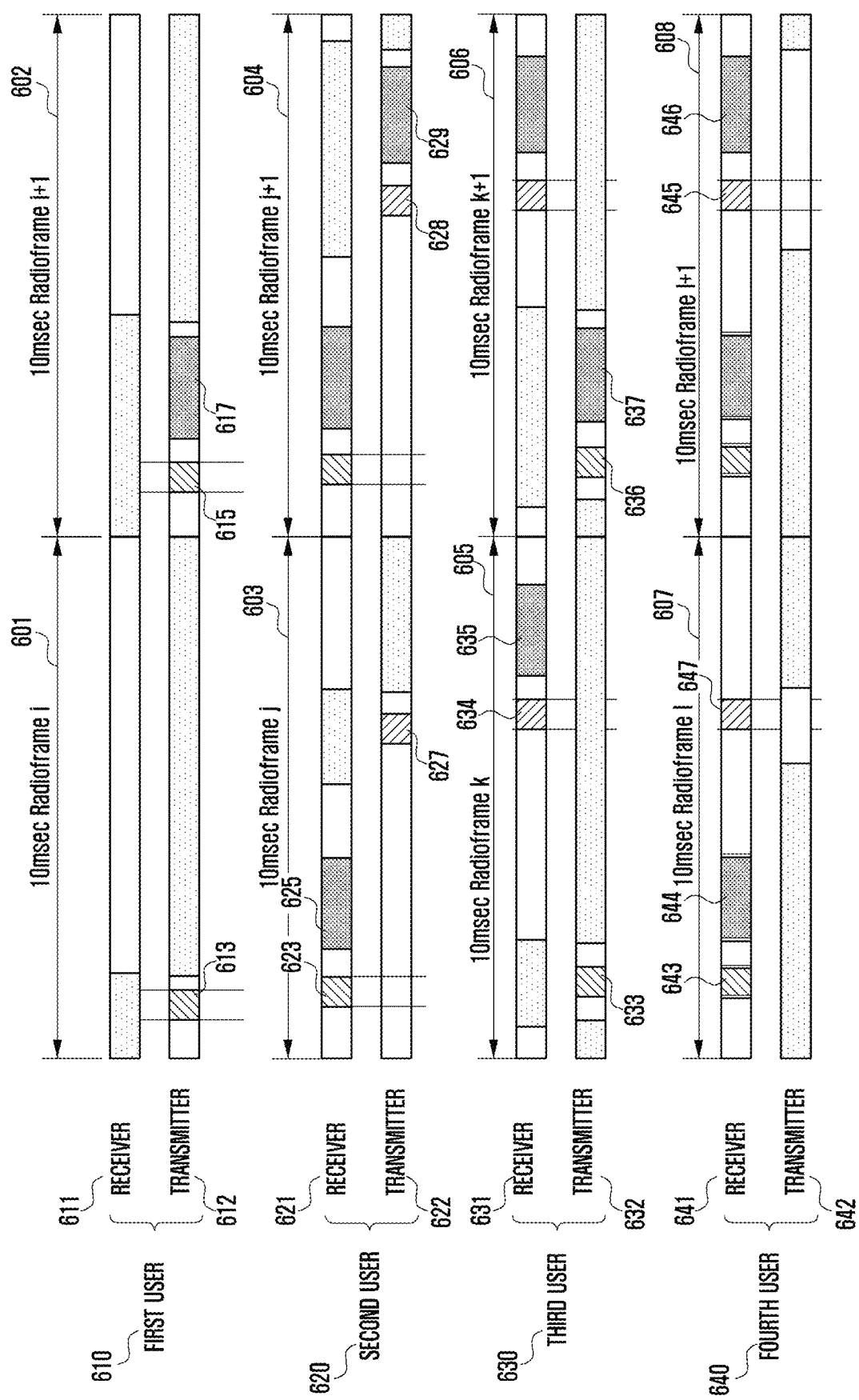
FIG. 6 illustrates a process of transmitting and receiving a data channel for device to device communication provided by an embodiment of the present invention.

FIG. 6 illustrates a data channel transmission method after the synchronization provided by an embodiment of the present invention.

Referring to FIG. 6, a first user 610, a second user 620, a third user 630, and a fourth user 640 are users corresponding to the first user 510, the second user 520, the third user 530, and the fourth user 540 of FIG. 5, respectively.

The first user 610 continuously transmits a first synchronization signal 613 to a UE which has initially configured the synchronization in a radio frame 601 to configure the network synchronization. At this time, the UE transmits a data channel 617 at a predetermined time point after transmitting a first synchronization signal 615. In an exemplary embodiment, it is assumed that the transmitted data is broadcast data which all UEs receive. In this case, after maintaining the synchronization while receiving a first synchronization signal 623, the second user 620 continuously waits for the data channel after the first synchronization signal. When the data channel 617 is transmitted to the first user 610, the second user 620 recognizes generation of a data channel 625. The second user 620 demodulates the data channel 625 and re-transmits the data channel 625 after a predetermined time 629 from a second synchronization signal 628 transmitted by the second user 620. The re-transmitted data channel 629 is the same as the received data channel 625. UEs synchronized using a second synchronization signal 634 such as the third user 630 receive a data channel 635 re-transmitted by the second user 620. In this case, like the second user 620, the third user 630 re-transmit a data channel 637 after transmitting a first synchronization signal 636. A UE such as the fourth user 640 receiving both a first synchronization signal 643 and a second synchronization signal 647 may not perform the transmission any more.

In such a data transmission method, after data channel transmission first starts, other UEs continuously re-transmit data. In this case, the transmitted data continuously overlaps. Accordingly, only when the UE initially performing transmission repeatedly transmits the same data for a predetermined transmission time, the data transmission quality is improved in the entire network and the data is propagated to UEs performing re-transmission. Further, only when the UE stops transmitting initially transmitted data channels and waits for a predetermined time, the UEs performing the re-transmission stops the re-transmission. Such a process is referred to as a transmission period and a refresh period, and FIG. 7 illustrates the transmission process.

Figure 7:
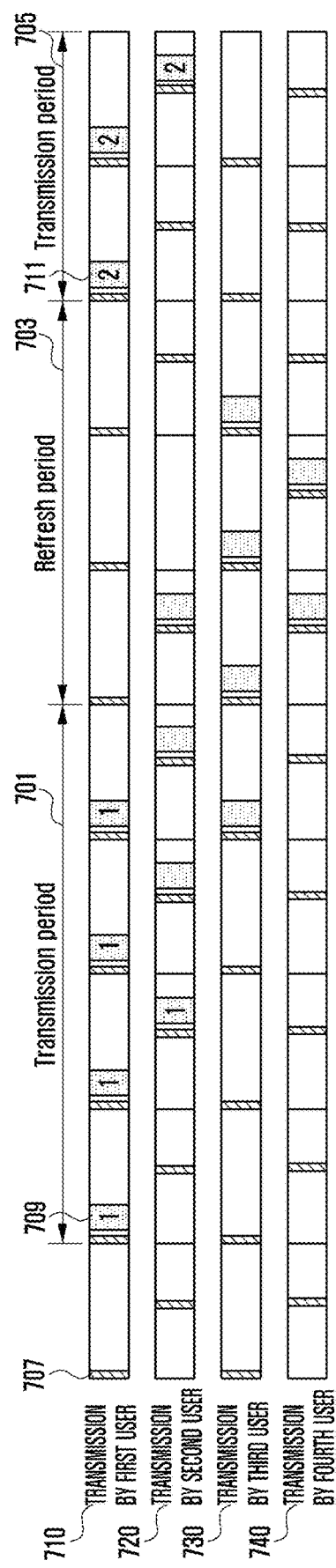
FIG. 7 illustrates a process of transmitting and receiving a data channel for device to device communication provided by an embodiment of the present invention.

FIG. 7 illustrates a process of transmitting and receiving a data channel for device to device communication provided by an embodiment of the present invention.

Referring to FIG. 7, when a first user 710 transmitting a first data channel 709 transmits the data channel 709, the first user 710 may transmit the same data channel by using a transmission period 701 until a second user 720, a third user 730, and a fourth user 740 re-transmit the same data channel to a large enough coverage. In some embodiments, whether the data channel is re-transmitted to the large enough coverage may be determined based on one or more of a preset time period, a location relation between adjacent UEs, and reception quality of the data channel which the UE receives.

Further, a refresh period 703 is configured before the first user 710 transmits a next data channel 711 and thus re-transmitted data is far away from the place where the user first transmitted the data, so that transmission of the new data 711 does not collide with a previous transmission. When the refresh period 703 is not made long enough, the second data channel 711 may collide in a side of a receiver, and accordingly broadcast transmission is not possible.

In unicast transmission, the data channel is transmitted in the same way as described above. When the user demodulates the data channel and a destination corresponds to the user, the user does not perform re-transmission. When the destination does not correspond to the user, the user performs the re-transmission. Determination of whether the destination is the user may be performed based on a destination indicator included in the data channel in some embodiments.

In an embodiment of the present invention, one or more different data channels may exist simultaneously, chronologically, or frequency divisionally and a plurality of users perform transmission in one radio frame.

In the embodiment of the present invention, although it has been assumed and described that the UE is in the asynchronous state where there is no BS, only the first user can perform transmission/reception with the BS and the remaining users cannot perform transmission/reception with the BS or the first user operates as a temporary BS in an embodiment of the present invention.

Further, in some embodiments, the UE having successfully received the data channel may control power allocation of the data channel which the UE will transmit based on reception channel of the received data channel. As described above, it is possible to prevent the same data channel from being transmitted to the UE which has transmitted the data channel by controlling power allocation of the data channel. More specifically, the UE in a transmission side may insert allocated power information into the data channel when the data channel is transmitted.

Figure 8:
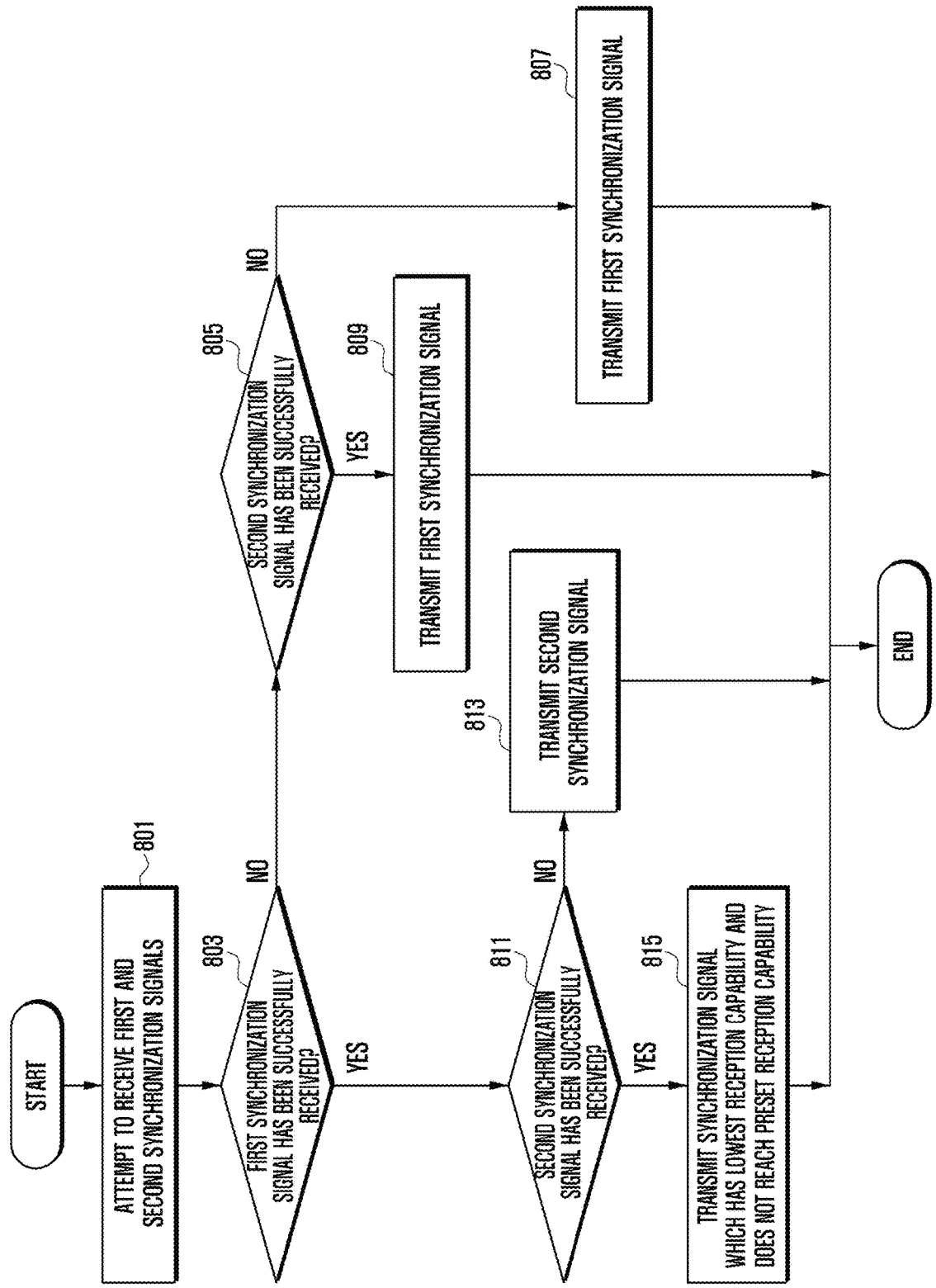
FIG. 8 illustrates operations of a UE for a synchronization method provided by an embodiment of the present invention.

FIG. 8 is a flowchart illustrating a synchronization operation of the UE when all users are in an asynchronous state according to an embodiment of the present invention.

Referring to FIG. 8, in step 801, the UE may attempt to receive the first synchronization signal and the second synchronization signal.

In step 803, the UE may determine whether the first synchronization signal has been successfully received.

As a result of the determination of step 803, when the terminal has failed to receive the first synchronization signal, the UE may determine whether the second synchronization signal has been successfully received in step 805.

As a result of the determination of step 805, when the UE has failed to receive the second synchronization signal, the UE transmits the first synchronization signal in step 807.

As a result of the determination of step 805, when the UE has successfully received the second synchronization signal, the UE may transmit the first synchronization signal in step 809.

As a result of the determination of step 803, when the terminal has successfully received the first synchronization signal, the UE may determine whether the second synchronization signal has been successfully received in step 811.

As a result of the determination of step 811, when the UE has failed to receive the second synchronization signal, the UE may transmit the second synchronization signal in step 813.

As a result of the determination of step 811, when the UE has successfully received the second synchronization signal, the UE has eventually received both the first synchronization signal and the second synchronization signal, and the UE may transmit any of the first synchronization signal and the second synchronization signal which has lower reception capability and does not reach a preset reception capability reference in step 815. In some embodiments, the preset reception capability reference may be determined based on an SINR value. Further, the UE may transmit one of the first synchronization signal and the second synchronization signal which has lower reception quality.

Figure 9:
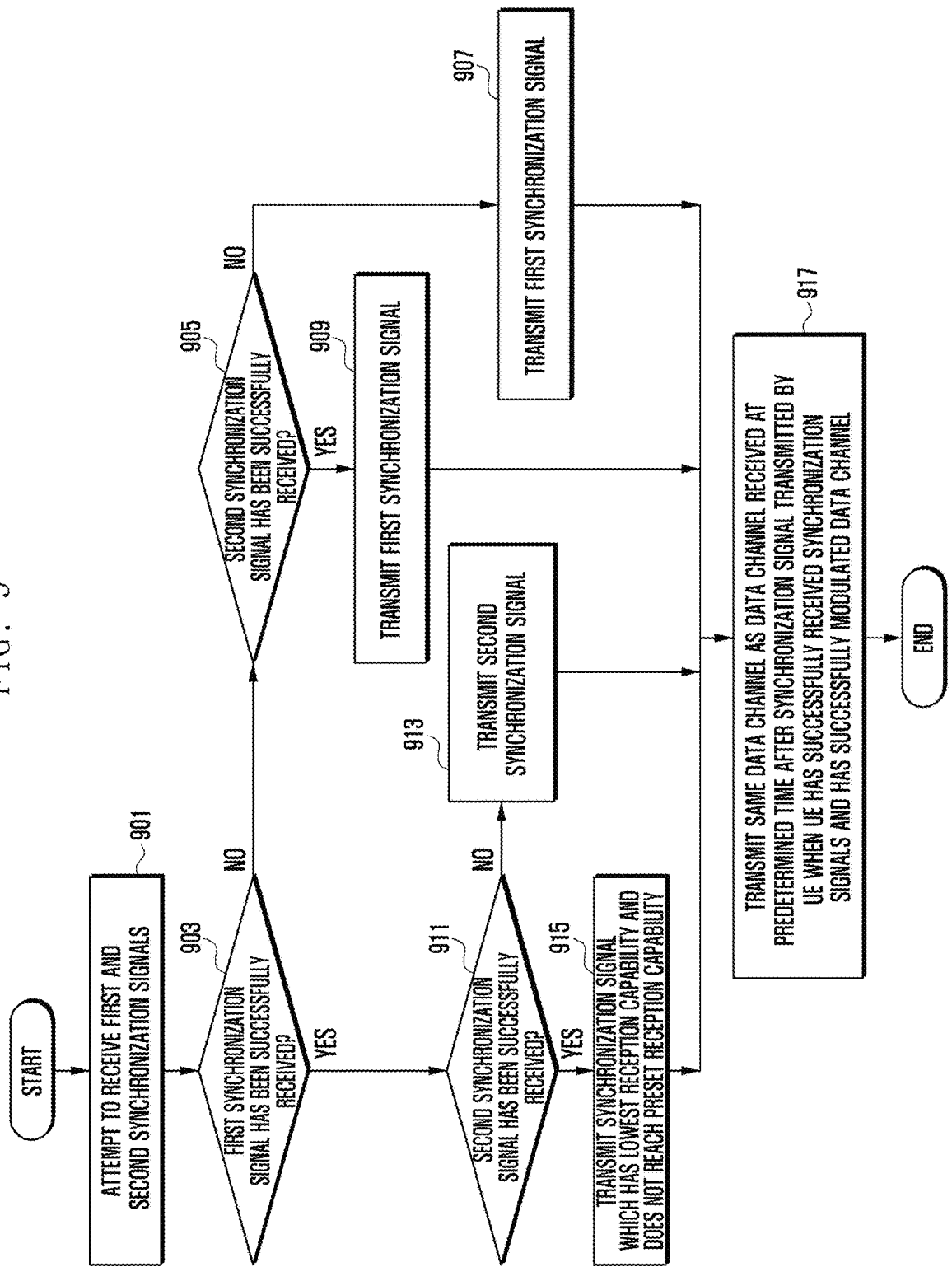
FIG. 9 illustrates operations of a UE for data channel transmission provided by an embodiment of the present invention.

FIG. 9 is a flowchart illustrating a data channel transmitting operation of the UE when all users are in a synchronous state according to an embodiment of the present invention.

Referring to FIG. 9, operations in steps 901 to 915 may correspond to steps 801 to 815 of FIG. 8, respectively.

In step 917, when the UE has successfully received the synchronization signals and has successfully modulated the data channel, the UE may transmit the same data channel as the data channel received at a predetermined time after the synchronization signal transmitted by the UE itself.

In some embodiments, synchronization signals including the first synchronization signal and the second synchronization signal and data channels may be transmitted in different channels. More specifically, the synchronization signals are transmitted in a downlink channel and the data channels are transmitted in an uplink channel.

In another embodiment, the synchronization signal and the data signal may be transmitted in the same channel.

Figure 10:
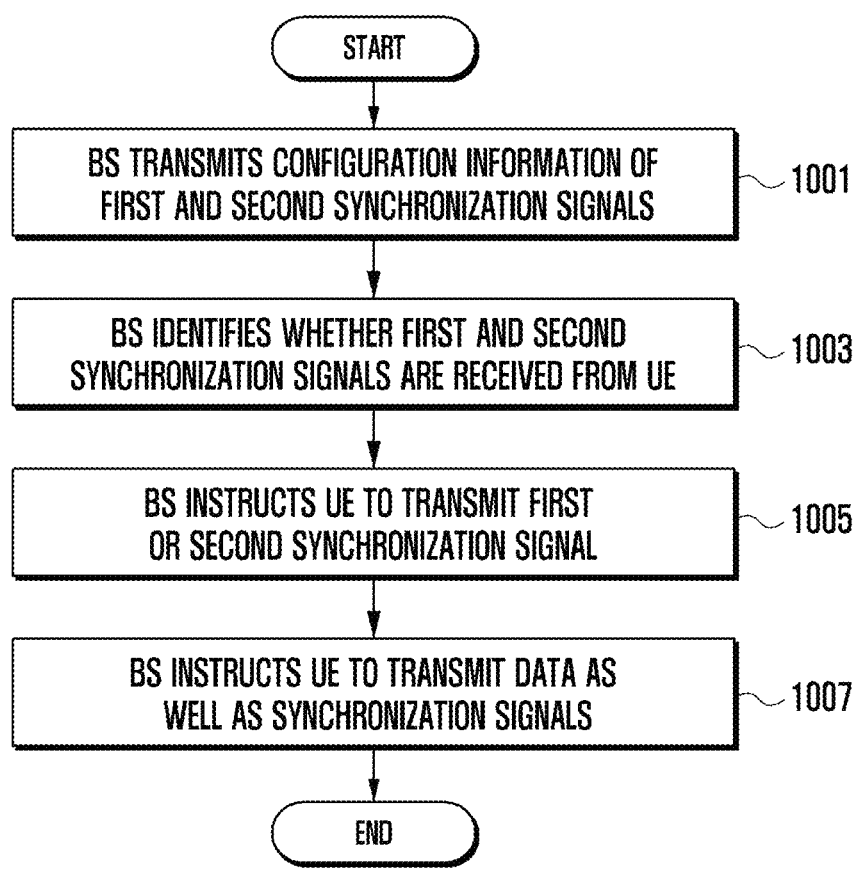
FIG. 10 illustrates operations of a UE for a synchronization method provided by an embodiment of the present invention.

FIG. 10 illustrates an operation of the BS in which a particular user configures a network for an asynchronous UE by an instruction of the BS according to an embodiment of the present invention.

Referring to FIG. 10, in the BS instructs the UE to receive the first synchronization signal and the second synchronization signal.

In step 1001, the BS transmits configuration information of the first synchronization signal and the second synchronization signal to the UE.

In step 1003, the BS identifies whether the first and second synchronization signals are received from the UE. It is to determine whether there is pre-configured synchronization transmission.

Thereafter, when the BS determines that the synchronization signal can be transmitted, the BS instructs the UE to transmit the first synchronization signal or the second synchronization signal in step 1005.

Next, in step 1007, the BS may instruct the UE to transmit data as well as the synchronization signals, which may be performed similarly to step 917 of FIG. 9.

Figure 11:
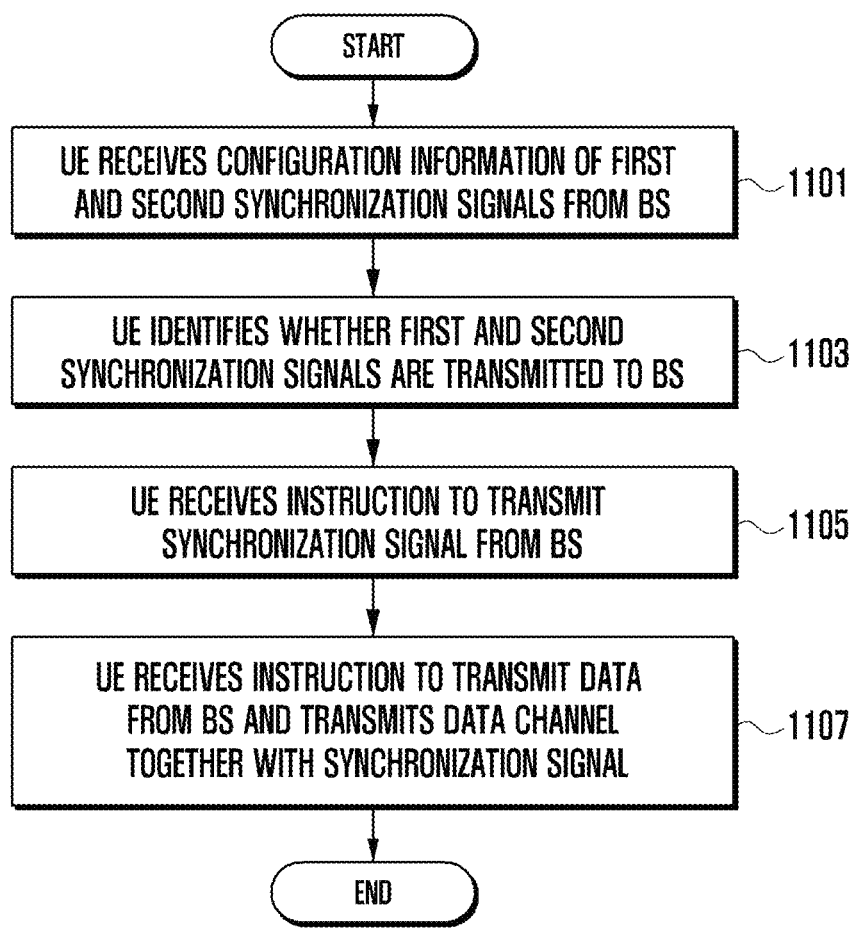
FIG. 11 illustrates operations of a UE for data channel transmission provided by an embodiment of the present invention.

FIG. 11 illustrates an operation of the UE in which a particular user configures a network for an asynchronous UE by an instruction of the BS according to an embodiment of the present invention.

Referring to FIG. 11, in step 1101, the UE receives configuration information of the first synchronization signal and the second synchronization signal from the BS.

M step 1103, the UE identifies whether the BS has received the first and second synchronization signals.

In step 1105, the UE receives an instruction to transmit the synchronization signal from the BS.

In step 1107, the UE receives an instruction to transmit data from the BS and transmits a data channel together with the synchronization signal. In some embodiments, an operation of step 1107 may be selectively performed.

Figure 12:
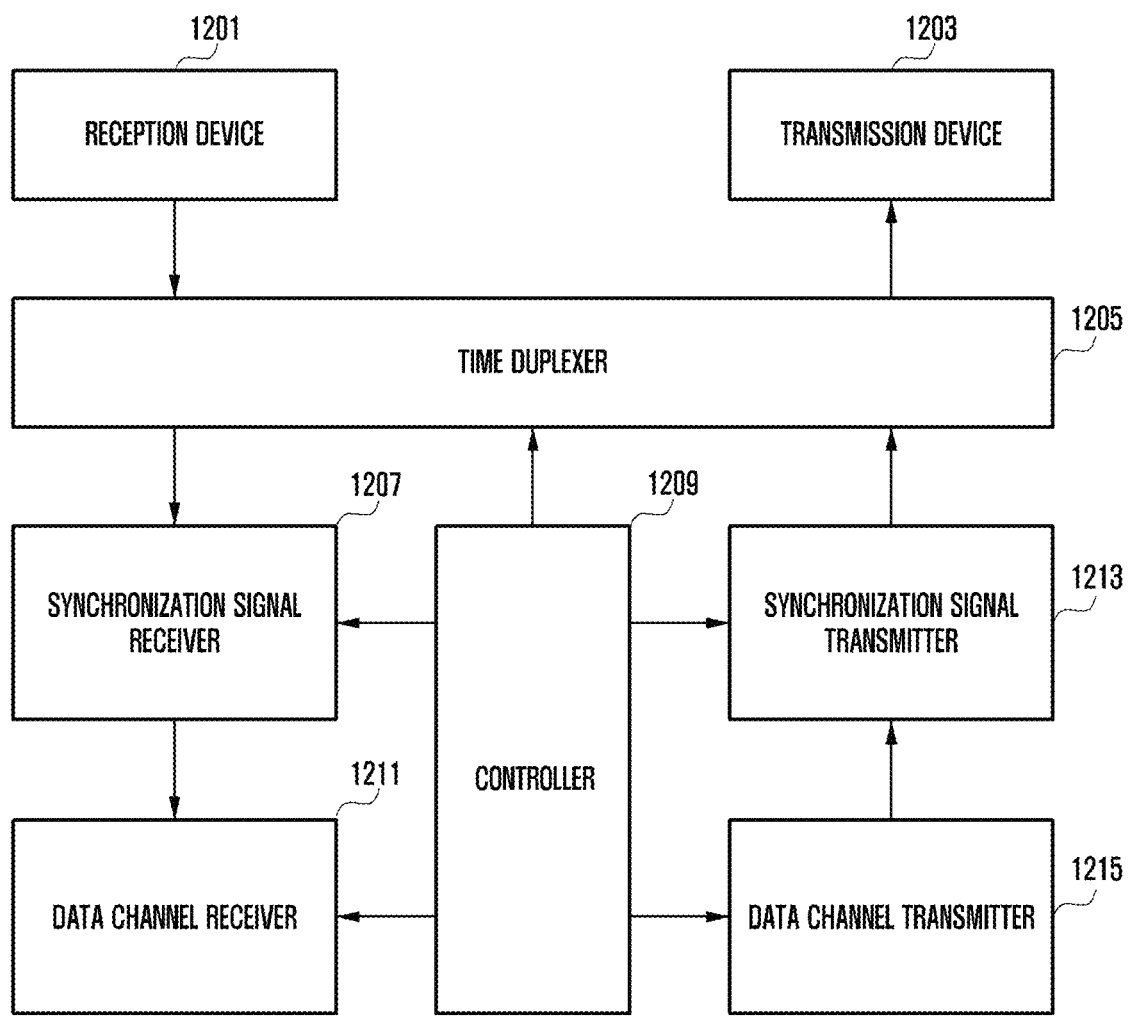
FIG. 12 illustrates components of a UE according to an embodiment of the present invention.

FIG. 12 is a block diagram illustrating an internal structure of a UE device supporting synchronization between UEs and data channel synchronization provided by an embodiment of the present invention.

Referring to FIG. 12, a UE controller 1209 receives a synchronization signal through a synchronization receiver 1207 by controlling a reception device 1201 and a transmission device 1203 through a time duplexer 1205 and transmits a synchronization signal through a synchronization signal generator 1213 according to the received synchronization signal. Thereafter, the UE controller 1209 receives data through a data channel receiver 1211 based on a data channel transmitted after the synchronization signal and re-transmits the data by using a data channel transmitter 1215. Further, the control of the operations may be performed through a controller (the controller 1209).

Embodiments of the present invention disclosed in the specification and the drawings are only particular examples to easily describe the technical matters of the present invention and assist in understanding of the present invention, and do not limit the scope of the present invention. It will be apparent to those having ordinary knowledge in the technical field, to which the present disclosure pertains, that it is possible to practice other modified embodiments based on the technical idea of the present disclosure as well as the embodiments disclosed herein.

Further, a method and an apparatus for device to device communication in a wireless communication system according to an embodiment of the present invention includes, as operations of the UE, an operation for receiving synchronization signal configuration information between UEs through higher signaling, an operation for searching for a synchronization signal in an asynchronous state, an operation for transmitting a synchronization signal in the asynchronous state, and more specifically, an operation for searching for a first synchronization signal or a second synchronization signal, an operation for transmitting the first synchronization signal when both the first synchronization signal and the second synchronization signal are not found in the asynchronous state, an operation for searching for the first synchronization signal and for performing synchronization with the first synchronization signal and transmitting the second synchronization signal when the second synchronization signal is not found in the asynchronous state, an operation for searching for the second synchronization signal and for performing synchronization with the second synchronization signal and transmitting the first synchronization signal when the first synchronization signal is not found in the asynchronous state, an operation for performing synchronization with the first synchronization signal and the second synchronization signal and transmitting no synchronization signal when both the first synchronization signal and the second synchronization signal are found in the asynchronous state, an operation for determining whether to transmit the synchronization signal based on reception signal quality of the received synchronization signal when the synchronization signal is found in the asynchronous state, and an operation for determining whether to transmit the synchronization signal based on reception signal quality of the received synchronization signal when the synchronization signal is found in the asynchronous state.

Operations after the synchronization between UEs is obtained provided by an embodiment of the present invention include an operation for transmitting a data channel together with the first synchronization signal when only the first synchronization signal is transmitted in a synchronous state, an operation for transmitting only the second synchronization signal in the synchronous state, an operation for repeatedly transmitting a data channel during a predetermined period in the synchronous state, and an operation for transmitting no data channel for a predetermined time after repeatedly transmitting the data channel during the predetermined period.

In addition, an operation for performing synchronization with the first synchronization signal and the second synchronization signal and transmitting no synchronization signal when both the first synchronization signal and the second synchronization signal are found in the asynchronous state, an operation for determining whether to transmit the synchronization signal based on reception signal quality of the received synchronization signal when the synchronization signal is found in the asynchronous state, and an operation for determining whether to transmit the synchronization signal based on reception signal quality of the received synchronization signal when the synchronization signal is found in the asynchronous state are included.

A UE device according to an embodiment of the present invention may include a UE controller for recognizing a status and instructing to receive and transmit a synchronization signal and a data channel, a synchronization signal generator for generating the first and second synchronization signals, a data channel transceiver for performing data transmission/reception after the synchronization, and a synchronization signal receiver for recognizing the reception of the synchronization signal.

Further, an embodiment of the present invention provides a synchronization method and apparatus for device to device communication in a wireless communication system, and more particularly to a method in which, when the UE is beyond the coverage of the BS or the BS does not operate due to a disaster situation, UEs obtain synchronization by themselves, configure a network therebetween in a particular area by using the obtained synchronization, and effectively transmit broadcast or unicast data channels based on the configured synchronization. Particularly, the embodiment of the present invention includes a method of determining whether to perform re-transmission according to a degree of the obtained synchronization of the first and second synchronization signals by the UE in one radio frame and obtaining entire synchronization.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

What is claimed is:

1. A method performed by a first terminal operating out of a coverage of a base station, the method comprising:
    obtaining configuration information including information on a first transmission timing and a second transmission timing associated with a synchronization signal, wherein the first transmission timing and the second transmission timing occur in one or more transmission periods;
    identifying whether a first synchronization signal is received from a second terminal in one of the first transmission timing and the second transmission timing in at least one of the one or more transmission periods;
    in a case that the first synchronization signal is received in the first transmission timing, transmitting a second synchronization signal in the second transmission timing; and
    in a case that the first synchronization signal is received in the second transmission timing, transmitting the second synchronization signal in the first transmission timing.

2. The method of claim 1, wherein the first transmission timing and the second transmission timing are configured such that a transmission timing of the first synchronization signal is different from a transmission timing of the second synchronization signal.

3. The method of claim 1, further comprising:
    transmitting the second synchronization signal in the first transmission timing or the second transmission timing in a case that the first synchronization signal is not received in the first transmission timing and the second transmission timing.

4. The method of claim 1, wherein a sequence of the second synchronization signal is identified based on a sequence of the first synchronization signal.

5. The method of claim 1, wherein the configuration information on the first transmission timing and the second transmission timing for a synchronization signal is preconfigured or configured by a higher layer signaling.

6. The method of claim 1, wherein receiving the first synchronization signal comprises:
    identifying a signal strength related to the first synchronization signal; and
    identifying, in a case that the signal strength is below a threshold value which is preconfigured or configured by a higher layer signaling, that the first synchronization signal is not received.

7. The method of claim 1, wherein a power for transmitting the second synchronization signal is identified based on information which is preconfigured or configured by a higher layer signaling.

8. The method of claim 1, wherein the configuration information on a first transmission timing and a second transmission timing for a synchronization signal includes a first offset for the first transmission timing and a second offset for the second transmission timing.

9. A first terminal operating out of a coverage of a base station, the first terminal comprising:
a transceiver; and
a controller coupled with the transceiver and configured to:
obtain configuration information including information on a first transmission timing and a second transmission timing associated with a synchronization signal, wherein the first transmission timing and the second transmission timing occur in one or more transmission periods,
identify whether a first synchronization signal is received from a second terminal in one of the first transmission timing and the second transmission timing in at least one of the one or more transmission periods,
in a case that the first synchronization signal is received in the first transmission timing, transmit a second synchronization signal in the second transmission timing, and
in a case that the first synchronization signal is received in the second transmission timing, transmit the second synchronization signal in the first transmission timing.

10. The first terminal of claim 9, wherein the first transmission timing and the second transmission timing are configured such that a transmission timing of the first synchronization signal is different from a transmission timing of the second synchronization signal.

11. The first terminal of claim 9, wherein the controller is further configured to transmit the second synchronization signal in the first transmission timing or the second transmission timing in a case that the first synchronization signal is not received in the first transmission timing and the second transmission timing.

12. The first terminal of claim 9, wherein a sequence of the second synchronization signal is identified based on a sequence of the first synchronization signal.

13. The first terminal of claim 9, wherein the configuration information on the first transmission timing and the second transmission timing for a synchronization signal is preconfigured or configured by a higher layer signaling.

14. The first terminal of claim 9, wherein the controller is further configured to:
identify a signal strength related to the first synchronization signal, and
identify, in a case that the signal strength is below a threshold value which is preconfigured or configured by a higher layer signaling, that the first synchronization signal is not received.

15. The first terminal of claim 9, wherein a power for transmitting the second synchronization signal is identified based on information which is preconfigured or configured by a higher layer signaling.

16. The first terminal of claim 9, wherein the configuration information on a first transmission timing and a second transmission timing for a synchronization signal includes a first offset for the first transmission timing and a second offset for the second transmission timing.

* * * * *